Nov. 23, 1965   H. W. ZIMMERMAN   3,219,855
COMPRESSED AIR COOLED SPINDLE UNIT
Filed Aug. 7, 1963   2 Sheets-Sheet 2
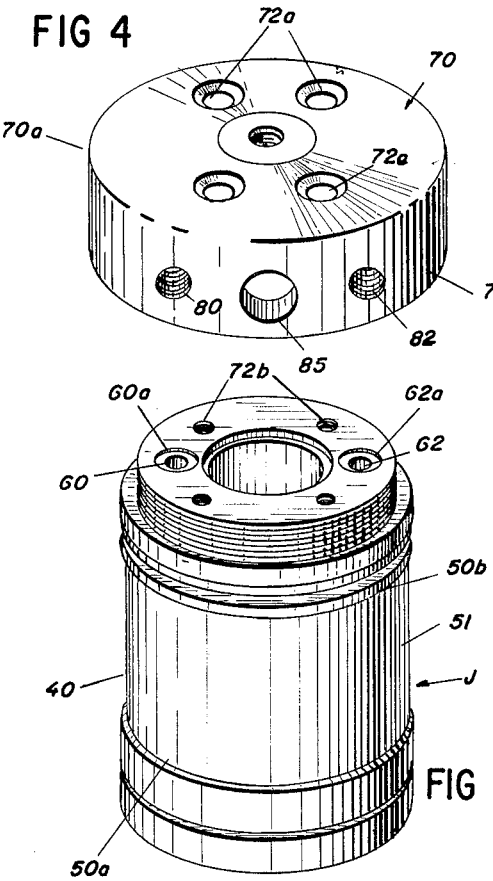
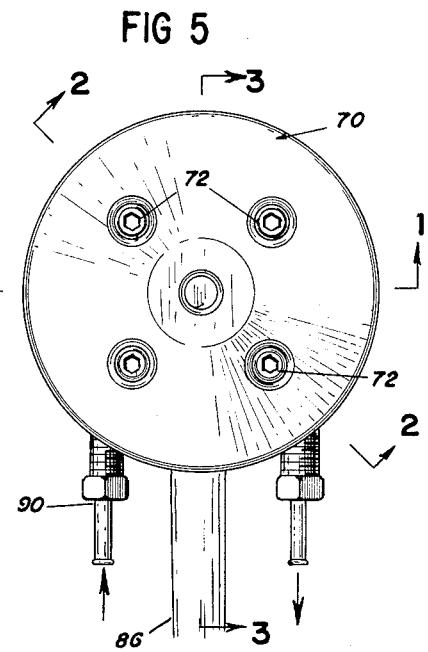
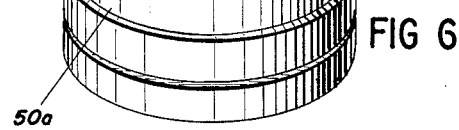
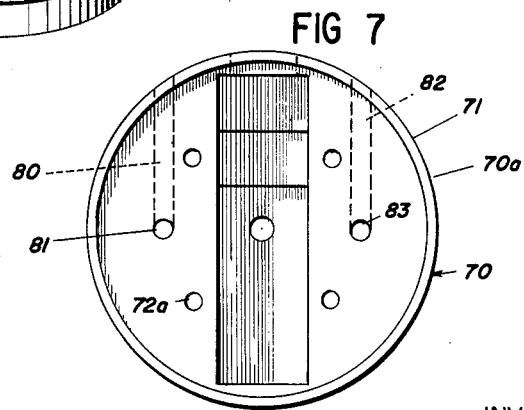
INVENTOR
Harvey W. Zimmerman
BY Peck & Peck
ATTORNEYS United States Patent Office
3,219,855
Patented Nov. 23, 1965

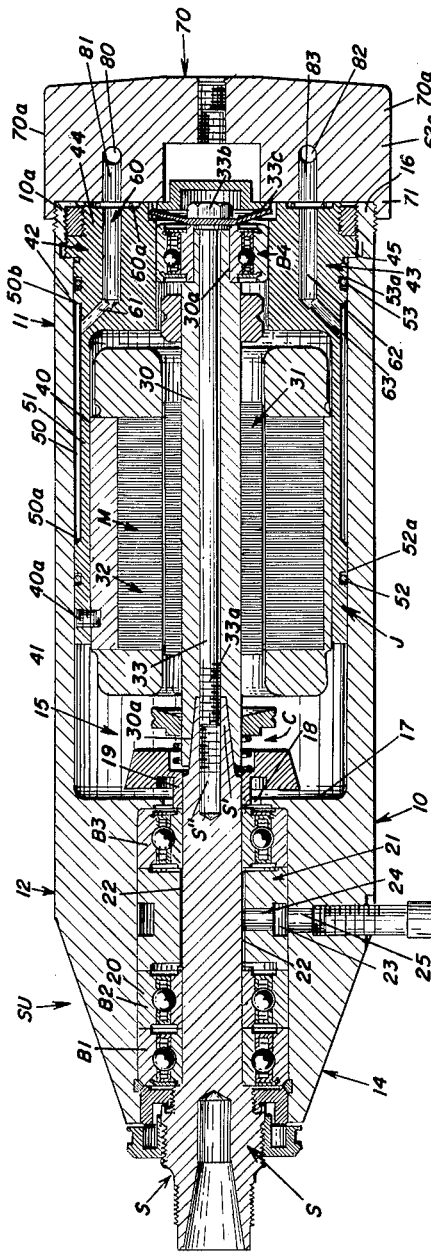

1

3,219,855
COMPRESSED AIR COOLED SPINDLE UNIT
Harvey W. Zimmerman, Racine, Wis., assignor to George Gorton Machine Co., Racine, Wis., a corporation of Wisconsin
Filed Aug. 7, 1963, Ser. No. 300,483
5 Claims. (Cl. 310—57)

This invention relates to certain Improvements in Compressed Air Cooled Spindle Units; and the nature and objects of the invention will be readily recognized and understood by those skilled in the arts to which the invention relates in the light of the following explanation and detailed description of the accompanying drawings illustrating what I now believe to be a preferred embodiment and mechaniacl expression of my invention from among various other embodiments, expressions and combinations of which the invention is capable within the broad spirit and scope thereof as defined by the claims hereto appended.

High speed, self-contained motorized spindle units such as widely used with various types and forms of machine tools, and for various other purposes, present serious cooling problems. Such motorized spindle units are generally typified by a housing within which there is mounted a high speed electric motor having its driven shaft directly coupled to and driving a spindle mounting a working member, such as a cutting tool, for high speed rotation thereby. Such high speed spindle units are at present generally cooled by a fan member mounted therein and driven by the motor thereof at high speed in order to provide a flow of air at high velocity necessary to cool such a motor and maintain its temperature within the desired temperature range. One of the serious objections to such fan cooling is the high level of noise developed, in addition to the problem of air blown chips and the high maintenance costs due to the excessive dirtying of the motor by deposits thereon from the circulating air.

In some instances water or a liquid coolant is used to cool the motor of such a spindle unit from a coolant chamber in the unit containing the coolant. Such cooling presents the problem of leakage from the coolant chamber and resulting damage to the motor and the spindle bearings.

It is a main object of my present invention to provide a cooling system for a motorized spindle unit utilizing air under pressure as the cooling medium in which the air is circulated in efficient heat exchange with the motor without direct contact therewith or with any of the moving parts of the spindle unit.

It is a further object to provide such an air cooled motorized spindle unit in which noise is reduced to a relatively low level by the elimination from the cooling system of the need for power driven mechanical components.

Another object is to provide a design and arrangement of such a cooling system in a motorized spindle unit in which the cooling air is circulated under pressure without blowing chips or other particles around when the spindle unit is utilized in a material cutting or removing operation.

Another object is to provide a cooling system in a motorized spindle unit which avoids the disadvantages of cooling systems utilizing liquid coolants.

A further object is to reduce the maintenance required due to the operation of the cooling system in a motorized spindle unit.

And a further object is to provide a built-in cooling system for a motorized spindle unit that requires no moving parts and has a minimum of structure to permit maintaining the desired dimensions of a spindle unit incorporating the system while being highly efficient in operation with a minimum of maintenance required.

2

With the foregoing and various other objects, features and results in view which will be readily apparent to and recognized by those skilled in the art from the following explanation and detailed description, my invention consists in certain novel features in design and construction of parts and in combinations and functioning thereof, all as will be more fully and particularly referred to and specified hereinafter.

Referring to the accompanying drawings in which similar reference characters refer to corresponding parts and components throughout the several figures thereof:

FIG. 1 is a longitudinal sectional view through a motorized spindle unit incorporating therein a compressed air cooling system embodying my invention.

FIG. 2 is a longitudinal sectional view through the compressed air intake or rear end of the spindle unit of FIG. 1, taken as on the line 2—2 of FIG. 5.

FIG. 3 is a longitudinal sectional view through the compressed air intake or rear end portion of the spindle unit of FIG. 1 taken as on the line 3—3 of FIG. 5.

FIG. 4 is a perspective view of the cap or closure head at the air intake or head end of the spindle unit of FIG. 1.

FIG. 5 is a view in end elevation of the air intake or head end of the spindle unit of FIG. 1, showing the cap or closure head of FIG. 4 in mounted and assembled position.

FIG. 6 is a perspective view of the cooling jacket of the spindle unit of FIG. 1.

FIG. 7 is a plan view of the under or inner side of the cap or closure head of FIG. 4.

As an example embodiment of my present invention I have selected a self-contained motorized spindle unit of the high speed type as especially designed for use as a spindle unit for machine tools for mounting and driving a cutting or material removing tool at high speeds. This example cutting unit incorporating and embodying the cooling system of the invention as a built-in part of the spindle unit is identified in its entirety by the reference character SU. It is to be understood, however, that the selection and disclosure of the machine tool type of motorized spindle unit SU is not by way of limitation, but primarily because such types of spindle units present the problems overcome by the cooling systems of the invention to a high degree and, hence, serve to more clearly demonstrate the solutions of such problems by the invention. The principles of the invention are intended for expression in various forms and arrangements for adaptation to and incorporation in various types of spindle units.

The example compressed air cooled, motorized spindle unit SU of my invention, referring now to FIG. 1, includes the spindle and motor housing 10 providing the powered and cooling air entrance rear end section 11 and the forward or spindle end mounting section 12 which is externally tapered forwardly to provide the spindle nose 14 from which the operating end of a motorized spindle S extends and is accessible. The housing 10 is bored or otherwise formed to provide the motor mounting chamber 15 within the section 11 of the housing 10 with this chamber 15 open at its rear end 16 through and forming the open rear end 10a of the housing. The housing 10 provides therewithin a forward end wall 17 across the forward end of the motor mounting chamber 15 and this end wall is provided with an axial bore 18 therethrough in which there is mounted a member 19 providing a bushing for rotatably receiving therethrough the inner end of the motorized spindle mounted in the forward section 12 of the housing 10.

A bore 20 is provided extending through the forward section 12 coaxial with and from bore 18 in wall 17 to and opening through the forward or spindle operating end thereof. The bore 20 is of greater diameter than the diameter of the bore 18 through the forward wall 17 of chamber 15, and a spindle S is rotatably mounted and journaled in and extending through the bore 20 by the forwardly located anti-friction bearing assemblies B1 and B2 and the rearwardly located bearing assembly B3. An annular spacing block and lubricant distributor 21 is mounted in the bore 20 between and holding and maintaining the front bearing assemblies B1 and B2 and the rear bearing assembly B3 in positions of proper spacing. The spindle S extends through the annular block 21 with lubricant passing clearance 22 around the spindle S between the spindle and the surface defining the bore provided through the annular block, as will be clear by reference to FIG. 1. A lubricant supply duct 24 is formed by a radial bore through the annular block 21 which opens at its inner end into the clearance space 22 around spindle S and at its outer, intake end opens through the outer side of the block 21.

The spindle mounting, forward section 12 of the housing 10 is provided with a radial bore 25 therethrough which is aligned with the lubricant duct 24 of the annular block 21, and this bore 25 at its inner end is in open communication with the outer end of the duct 24. (See FIG. 1). A supply tube 26 is threaded into the bore 25 and discharges lubricant in the form of an oil mist supplied from a suitable source (not shown). Thus, oil mist passes through the duct 24 into the clearance space 22 and from the latter space to and through the bearing assemblies B1, B2 and B3. It is to be particularly noted that the spindle S and the bearing assemblies B1, B2, and B3 mounted in section 12 of the housing 10 are substantially closed and are not open to the exterior for substantial air circulation and deposit of dust and other air carried foreign particles thereon and therein.

This present example of a motorized spindle unit SU embodying the invention is powered by a motor identified generally by the reference character M, as shown in FIG. 1. The motor M is mounted in the chamber 15 of section 11 of the housing 10, and includes a motor shaft 30 mounting and rotated by an armature 31 rotatably mounted within an annular field coil 32 which is secured in fixed position, all in the manner familiar in the art. The motor M is mounted in the chamber coaxial with the housing 10 and the chamber 15 with the motor shaft axially aligned with and coupled at its forward end in driving connection with the inner or rear end of the spindle S by any suitable coupling assembly identified generally by the reference character C in FIG. 1. In this instance, the rear end of spindle S extends through the bushing unit 18 into the chamber 15 and terminates therein in a tapered end S' with an internally threaded, open end bore S" extending through the spindle end S' a distance into the spindle. The forward end of the motor shaft 30 is provided with a tapered socket 30a which receives and into which the tapered end S' of spindle S seats. A fastening bolt or rod 33 is mounted in and extending through an axial bore through the motor shaft 30 for free rotation and axial movements therein and therethrough. The forward end 33a of rod 33 is externally threaded and is threaded into the bore S' of spindle S, and the opposite or rear end of the rod is provided with the head 33b. Thus by screwing rod 33 forwardly into bore S' of spindle S, the motor shaft 30 and the spindle are drawn together and tightly coupled for driving operation of the spindle by the motor shaft with no undesired play or relative movement therebetween.

Following the principles and teachings of my invention as expressed in the form of the example compressed air cooled spindle unit SU hereof, I provide a cooling jacket unit identified generally by the reference character J. This cooling jacket unit J is preferably formed of aluminum, or any other material having high heat conductivity, and not only functions as a heat transfer member, but also as the main mounting for the field coil unit 32 of the motor M in the housing 10. Referring to FIGS. 1 and 6 in particular, the cooling jacket J includes a cylindrical hollow body or barrel 40 which has maximum external diameters to fit within the motor mounting chamber 15 and which is suitably secured in fixed position. The field coil unit 32 of the motor M is inserted into mounted position within the body 40 and secured in fixed position therein as by screws 40a, or in any other desired manner. The forward end 41 of the body 40 of cooling jacket J is open and the field coil unit 32 of the motor M may be inserted and secured in position therein before the cooling jacket is inserted and secured in position in chamber 15. Then the jacket J and field coil unit 32 may be inserted over the armature and motor shaft 30 with the motor M then in proper assembly for operation of the motor.

The rear end of the cooling jacket J is identified generally by the reference character 42 and in this example takes the form of a solid metal head 43 intergral with the body or barrel 40 of the jacket. This head 43 terminates in a reduced diameter end portion 44 that is externally screw threaded and a flange 45 that extends radially outwardly around the head is provided at and forming a portion of the base of the reduced diameter end portion 44. The open rear end of the housing 10 is counterbored at 10b and internally threaded and provides a shoulder 10c therearound on which the flange 45 seats when the cooling jacket J is secured in position in the housing 10. The cooling jacket J is secured and locked into position by the locking ring 46 threaded onto the end portion 44 of the jacket and into the counterbore 10b at the end 10a of housing 10.

The head 43 of the cooling jacket unit J is provided with a relatively large diameter axial bore 46 therethrough and the shaft 30 of motor M is extended rearwardly into such bore and terminates in a reduced diameter rear end 30a which is mounted and journaled in a bearing assembly B4 that is mounted and secured in the axial bore 46. The fastening rod 33 extends rearwardly a distance beyond bearing assembly B4 and has the head 33b thereof engaged with and against the fixed position bearing assembly B4, a flat spring member 33c being mounted in position between the head 33b and the bearing assembly. In this manner the motor shaft 30 and the spindle S are coupled rigidly together and constitute a unitary shafting mounted and journaled in the bearing asemblies B1, B2, B3 and B4 for high speed rotation by the motor M.

A cooling system of my invention provides for a cooling air chamber for the continuous forced circulation of air therethrough around the cooling jacket J for conduction of heat through the jacket from the motor M to the circulating air with continuous discharge of the resulting heated air to atmosphere and replenishment of the discharged heated air by cooler air for continuous abstraction of heat from the motor to maintain the latter at a temperature within the desired temperature range. And as a feature of my invention such cooling is effected by the circulation of cooling air under pressure without permitting such cooling air to have access to or contact with the motor M or the bearing assemblies B1, B2 and B3 for the spindle S or the bearing assembly B4 for the motor shaft 30.

In the example compressed air, high speed motorized spindle unit SU these advantages and results are attained in a practical manner by providing the cooling air circulating chamber 50 over and around the cooling jacket J between the jacket and the housing 10 and sealing chamber 50 from the motor M and the bearing assemblies B1, B2, B3 and B4 and the motor shaft 30 and the spindle S driven thereby. The chamber 50 is formed by providing the intermediate section 51 of the body or barrel 40 of the jacket J of reduced external diameter. With the jacket J in assembled, mounted position in the housing 10 the outer side of the reduced diameter section 51 then forms the inner side wall, the inner side of the housing 10 opposite the section 17 forms the outer side wall, and the edges 50a and 50b of the forward and rear sections of maximum diameter of the body 40 of the jacket form the front and rear end walls, respectively, of the chamber 50. An O-ring 52 is seated in a suitable groove 52a in and around the forward section of maximum diameter and an O-ring 53 is seated in a suitable groove 53a in and around the rear section of maximum diameter of the body 40 of the jacket J. In this manner the cooling chamber 50 is sealed-off from the motor mounting chamber 15 and the motor M, and also from the bore 20 and the spindle S and the bearing assemblies B1, B2 and B3 for the shaft S mounted in the bore 20.

An inlet air duct 60 is provided through the rear end head 42 and the inner end thereof is connected with and opens into the rear end of the cooling air chamber 50 through the radially outwardly inclined extension duct 61. A heated air discharge duct 62 is similarly provided through the rear end of the head 43 at a diametrically opposite location in head 43 from the intake duct 60 and is in communication with the rear end of chamber 50 for discharge of air therefrom through the radially outwardly inclined extension duct 63. In the operation of the cooling system cooling air under pressure is discharged through the ducts 60–61, circulates through chamber 50 around the body 40 of the cooling jacket J in heat exchange relation therewith and after removing heat therefrom discharges from the cooling chamber through the air outlet or discharge ducts 62–63.

The example air cooled spindle unit SU of the invention is completed in structure and assembly by the rear end or top cap member 70 which is preferably formed of aluminum and has relatively substantial thickness and which is threaded onto and over the rear or top end 10a of housing 10 and the head 43 of the cooling jacket unit J. The rear end 10a of the housing 10 is provided with external threading 10b. The cap 70 is provided with a peripheral flange 71 therearound which is internally threaded to fit and thread onto the external threading 10b on the rear or top end of the housing 10 with the cap 70 in assembled and mounted position thereon, as shown in FIGS. 1, 2 and 3. The cap 70 held and secured tightly in mounted position by the threaded bolts or screws 72 rotatably received in and extending through the bores 72a provided in the cap 70 and threaded tightly into the internally threaded bores 72b in the head 43 of the cooling jacket J. The spacing of the head bores 72b in and around the head 43 is the same as the spacing of the cap bores 72a in and around the cap 70 so that the bores 72a may be aligned with the bores 72b, respectively.

A cooling air inlet passage or duct 80 is provided through the side wall 70a of cap 70 and extends a distance thereinto and at its inner end opens into a duct 81 that is normal to duct 80 and extends inwardly from duct 80 axially of the cap 70. The duct 81 opens through the inner or under side of cap 70 in position for alignment with the inlet passage or duct 60 through head 43 of the cooling jacket J. (See FIG. 1.) An air outlet passage or duct 82 is also provided through the side wall 70a of the cap 70 spaced a distance therearound from the inlet duct 82. The outlet or discharge duct 82 extends a distance into the cap 70 and at its inner end opens into a duct 83 that is normal to duct 82 and which extends inwardly from duct 82 axially of the cap 70. The outlet duct 83 opens through the inner or under side of cap 70 in position for alignment with the outlet or discharge passage 62 through head 43 of the cooling jacket J. (See FIG. 1.) A circular recess 60a is formed in the outer end of the head 43 around the open end of the inlet duct 60 therein and a similar circular recess 62a is formed in head 43 around the open end of the discharge duct 62. These recesses 60a and 62a receive and mount therein the sealing O-rings 60b and 62b (See FIG. 1) for sealing and forming a leak-proof joint between the inner side of cap 70 and the outer end of head 43 around the aligned ducts 60 and 81 and 62 and 83.

The side wall 70a of the cap 70 is formed with an aperture 85 therethrough which in this instance happens to be located between the air inlet duct 80 and the air outlet duct 82, as shown in FIG. 4 of the drawings. This cap aperture 85 receives and mounts therein the end of a conduit 86 which carries therein the electric circuit wires 87 to the motor M. A further conduit 88 is mounted in and extends through head 43 of the cooling jacket J from the space at the under side of cap 70 to the adjacent end of the motor and receives and houses the electric circuit wires 87 which are extended therethrough for operative connection to the motor in a manner familiar in the art, all as will be clear by reference to FIG. 3 of the drawings.

In the operation of the example compressed air cooled, motorized spindle unit SU incorporating the invention, the air inlet duct 80–81, through cap 70 is connected through tubing 90 (see FIG. 5) with a source (not shown) of compressed air under a suitable pressure. Such compressed air then passes from inlet duct 81 into the inlet duct 60–61 and from inlet duct 61 is discharged into the cooling chamber 50 which surrounds the cooling jacket J. The cooling air then circulates through chamber 50 and over and around the cooling jacket J with the heat generated by the high speed motor M being conducted through jacket J to the cooling air which is circulating at lower temperatures through chamber 50. The outlet ducts 63–62 and 83–82 provide the low pressure side of the cooling air circulating system so that the air which has received heat from jacket J and been heated thereby circulates through chamber 50 to and discharges through the outlet ducts 63–62 and 83–82 and the tubing 91 (see FIG. 5) to any location of lower pressure than the input air pressure in the chamber 50. In this manner air is continuously circulated through chamber 50 and continuously extracts and removes heat from the motor M to maintain its temperature within the required temperature range for proper and efficient motor operation. And such heat removal and motor cooling is done without moving mechanical parts and with noise from the cooling operation at a satisfactorily low noise level.

The O-rings 52 and 53 in the grooves 52a and 53a seal off the cooling chamber 50 and the circulating cooling air through the cooling chamber 50 is confined and restricted to that chamber. Air from the chamber 50 is not permitted to gain access to the motor M or to the spindle S and its bearing assemblies B1, B2 and B3, so that fouling of the motor M and of the spindle S and its bearing assemblies B1, B2 and B3 by the deposit thereon of air borne foreign particles from the cooling air circulating thereover is eliminated. The spindle S and its bearing assemblies B1, B2 and B3 are independently lubricated by supplying an oil mist through the supply tube 26, duct 25, and the duct 24 into the lubricant clearance space 22 through the annular block 21 and between that block and the spindle S.

Efficient cooling of the motor M and of the housing 10 is thus effected with a minimum of structure and with no moving mechanism or parts. Preferably, but not necessarily, the cooling jacket J is formed of a material having higher heat conductivity than the heat conductivity of the material of which the housing 10 is formed so that heat from the motor M is taken up and removed by the circulating air at a rate to prevent undesired heating of the housing.

While I have selected and herein illustrated and described a specific type and form of high speed, motorized spindle unit incorporating therein a cooling system of my invention, it will be clear that the invention is adapted to incorporation in various other types and form of motorized mechanisms where motor cooling presents problems and conditions similar or analogous to those overcome in the present example unit.

It will also be evident that various changes, modifications, variations, substitutions, eliminations and additions may be resorted to without departing from the broad spirit and scope of my invention; hence I do not intend or desire to limit my invention in all respects to the exact and specific example embodiments or expressions of the invention, as herein disclosed and described, except as may be required by intended specific limitations thereto appearing in any of the claims hereto appended.

What I claim is:

1. An air cooled motorized spindle unit, including, in combination, a housing having a motor mounting compartment therewithin; a motor mounted in said compartment, and including a driven motor shaft extending through said compartment; bearing assemblies mounted in said housing in axial alignment with said motor shaft; a spindle rotatably mounted in said bearing assemblies and being operatively coupled at one end thereof with the adjacent end of said motor shaft; said motor mounting compartment being substantially closed-off from said bearing assemblies and the length of the spindle extending thereacross and therebetween; means for supplying a lubricant to said spindle and said bearing assemblies; a cooling jacket mounted in said housing around and along said motor in heat transfer relation therewith; said cooling jacket and said housing being formed to provide a cooling air circulating chamber therebetween around said motor in heat exchange relation with said cooling jacket; means sealing said cooling air circulating chamber against escape of air therefrom to said motor; and said spindle unit having an air inlet passage into and an air outlet passage from said cooling air circulating chamber.

2. An air cooled, motorized spindle unit, including, in combination, a housing; an electric motor mounted in said housing and including a rotary shaft driven thereby; a spindle mounted and journaled in said housing in position in axial alignment with said motor shaft; means connecting said spindle in driven relation with said motor shaft; a cooling jacket formed of material of high heat conductivity mounted in said housing surrounding and in heat conducting relation with said motor; said cooling jacket and said housing providing therebetween a cooling air circulating chamber along and around and in heat transfer relation with said jacket; means sealing said cooling chamber against leakage of air therefrom; said cooling jacket at the outer end thereof in said housing having a head portion thereacross; a bearing assembly mounted in said head portion of said cooling jacket and the adjacent end of said motor shaft being mounted and journaled therein; and said head portion having therein and therethrough an air inlet passage to said cooling chamber and an air outlet passage from said cooling chamber.

3. An air cooled, motorized spindle unit, including, in combination, a housing having a motor mounting compartment therein opening through one end of said housing; a cooling jacket of material of high heat conductivity mounted in said motor mounting compartment and extending to said end of the housing; said cooling jacket and said housing forming therebetween an annular cooling air circulating chamber around and in heat transfer relation with said cooling jacket; means sealing said cooling air circulating chamber against leakage of air therefrom into said motor mounting compartment; a motor mounted within said cooling jacket in heat transfer relation therewith; a spindle mounted and journaled in said housing in driven connection with said motor; and said cooling jacket having therein an inlet passge to said cooling chamber for discharging air into the latter and an outlet passage from said chamber for discharging air therefrom.

4. In the combination of claim 1, said housing having an open end, a cap member removably mounted on and over said open end of said housing; and said cap member having therethrough an air intake passage and an air discharge passage for alignment with said air inlet passage and said air outlet passage, respectively, of said cooling jacket with said cap member in mounted position.

5. An air cooled, motorized spindle unit, including, in combination, a housing having a motor mounting compartment therein opening through one end of said housing and said housing providing a closure wall at the opposite end of said compartment at a location intermediate of said housing; a spindle rotatably mounted and journaled in said housing between said closure wall of said compartment and the adjacent end of said housing; a cooling jacket of material of high conductivity mounted in said motor mounting compartment and extending to said open end thereof; said cooling jacket having a head thereacross at the open end of said motor mounting compartment; a motor mounted in said cooling jacket in heat transfer relation therewith; means operatively connecting said spindle with said motor in driven relation with the latter; said cooling jacket and said housing forming therebetween and therearound a cooling air circulating chamber surrounding said cooling jacket in heat transfer relation therewith; means sealing said air circulating chamber against leakage therefrom; said end head of said cooling jacket having an air inlet passage therethrough to said air circulating chamber and an air outlet passage therethrough from said chamber; and an end closure cap for said open end of said housing removably mounted in position over and across said head of said cooling jacket; and said cap member having an air intake passage therethrough discharging into said inlet passage of said head of said cooling jacket and an air discharge passage therethrough in communication with said outlet passage through said cooling jacket head.

References Cited by the Examiner
UNITED STATES PATENTS 2,066,740    1/1937    Ripsch _____ 310—57
2,696,569    12/1954    Schumann _____ 310—50

ORIS L. RADER, *Primary Examiner.*

MILTON O. HIRSHFIELD, *Examiner.*